(12) United States Patent
Huusko

(10) Patent No.: US 6,674,733 B1
(45) Date of Patent: Jan. 6, 2004

(54) DETERMINING BEARER SERVICES IN A RADIO ACCESS NETWORK

(75) Inventor: Sami Huusko, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/469,853

(22) Filed: Dec. 22, 1999

Related U.S. Application Data (63) Continuation of application No. PCT/FI98/00549, filed on Jun. 23, 1998.

(30) Foreign Application Priority Data

Jun. 30, 1997 (FI) .................................... 972815

(51) Int. Cl.⁷ .......................... H04Q 12/50; H04Q 7/20
(52) U.S. Cl. ................................. 370/329; 455/450
(58) Field of Search ........................... 370/468, 329, 370/310, 338, 341, 351, 389; 455/445, 452, 450, 509, 512, 452.1, 452.2, 62

(56) References Cited

U.S. PATENT DOCUMENTS

| | | | |
|---|---|---|---|
| 5,181,200 A | * 1/1993 | Harrison ...................... | 370/468 |
| 5,440,547 A | 8/1995 | Easki et al. | |
| 5,629,974 A | 5/1997 | Rajala et al. | |
| 6,097,733 A | * 8/2000 | Basu et al. ................. | 370/468 |
| 6,167,248 A | * 12/2000 | Hamalainen et al. ........ | 455/403 |
| 6,351,470 B1 | 2/2002 | Räsänen | |

FOREIGN PATENT DOCUMENTS

| | | |
|---|---|---|
| EP | 660569 | 6/1995 |
| FI | 955355 | 5/1997 |
| WO | 96/35300 | 7/1996 |
| WO | 97/10684 | 3/1997 |
| WO | 97/12490 | 4/1997 |
| WO | 97/16890 | 5/1997 |
| WO | 97/47119 | 12/1997 |

* cited by examiner

Primary Examiner—Nguyen T. Vo
(74) Attorney, Agent, or Firm—Squire, Sanders & Dempsey L.L.P.

(57) ABSTRACT

The invention relates to a method and an arrangement for supporting TCP/IP services in a cellular radio access network connected to a telecommunications network offering TCP/IP services. In accordance with the invention, the bearer service parameters required by different TCP/IP services are predetermined in the radio access network, the correct parameters for a given connection being selected by identifying the TCP/IP service on the basis of the content of the first IP packet received. Thus, different TCP/IP services can be handled in different ways in the radio access network and a bearer service that best corresponds to the actual needs can be established through the radio access network. This way, good service quality to the user is ensured and, furthermore, optimization of the capacity of the radio access network is made possible when only correct-type capacity is reserved for each connection.

18 Claims, 4 Drawing Sheets

DETERMINING BEARER SERVICES IN A RADIO ACCESS NETWORK

The application is a continuation of PCT/FI98/00549 filed Jun. 23, 1998.

BACKGROUND OF THE INVENTION

The invention relates generally to cordless telecommunications systems, and particularly to supporting TCP/IP services in a cellular radio access network connected to a telecommunications network offering TCP/IP services.

Currently under development are third generation mobile communications systems, such as the Universal Mobile Communication System (UMTS) and the Future Public Land. Mobile Telecommunication System (FPLMTS) which has later been renamed as IMT-2000 (International Mobile Telecommunication 2000). UMTS is under standardization at ETSI (European Telecommunications Standards Institute), whilst ITU (International Telecommunication Union) is standardizing the IMT-2000 system. These future systems are very similar in their basic features. In the following, the UMTS system will be dealt with in more detail.

Like all mobile communications systems, UMTS produces cordless data transmission services to mobile users. The system supports roaming, in other words, UMTS users can be reached and they can make calls anywhere, as long as they are located within the UMTS coverage area. UMTS is anticipated to satisfy a wide variety of future service needs, such as high-speed data services (multi-media), and video services, such as video calls. Many future services that will be needed are difficult to envision; therefore it is not possible to optimize UMTS to one group of services only. One conclusion from this is that UMTS must be constructed to be versatile and to permit further development. For this reason, a modular approach for the network architecture has been adopted, making it possible to implement UMTS effectively in different environments.

Figure 1:
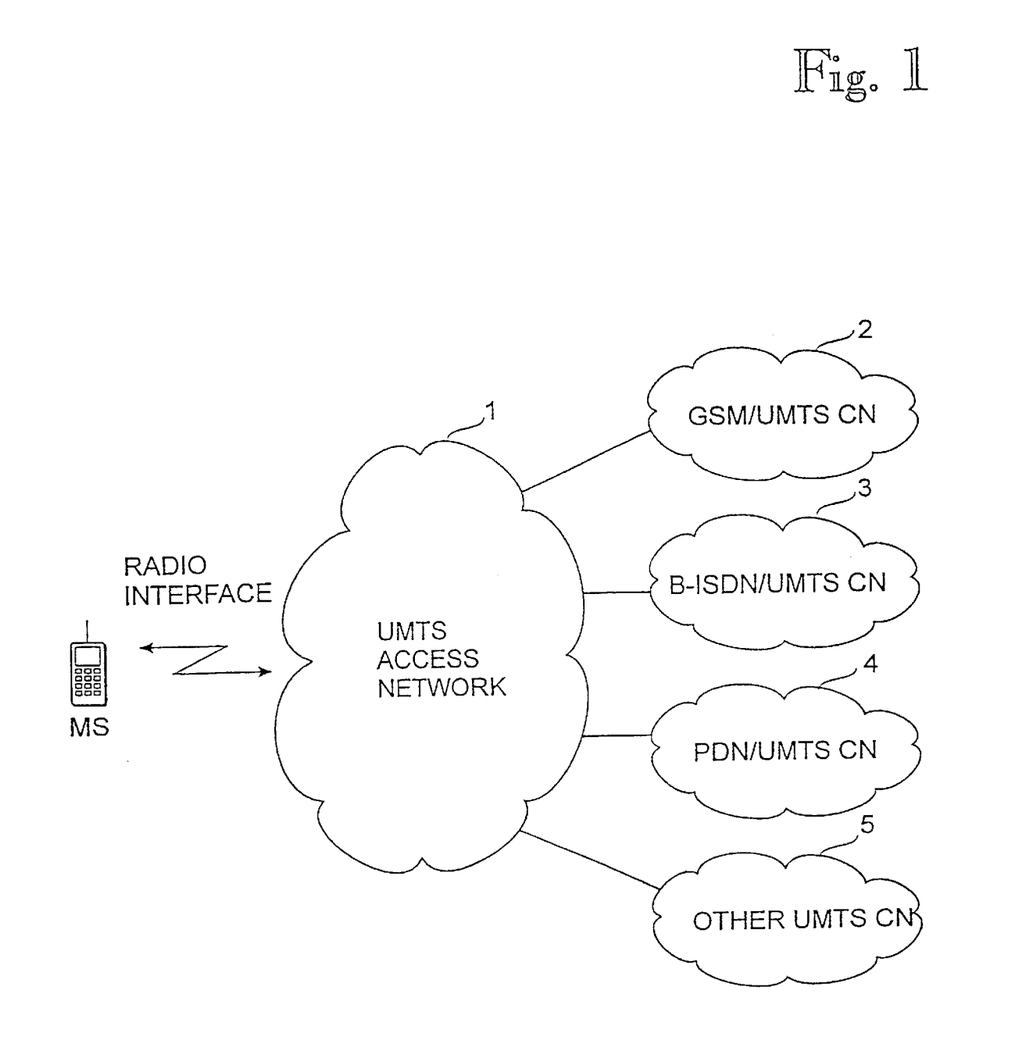
Figure 2:
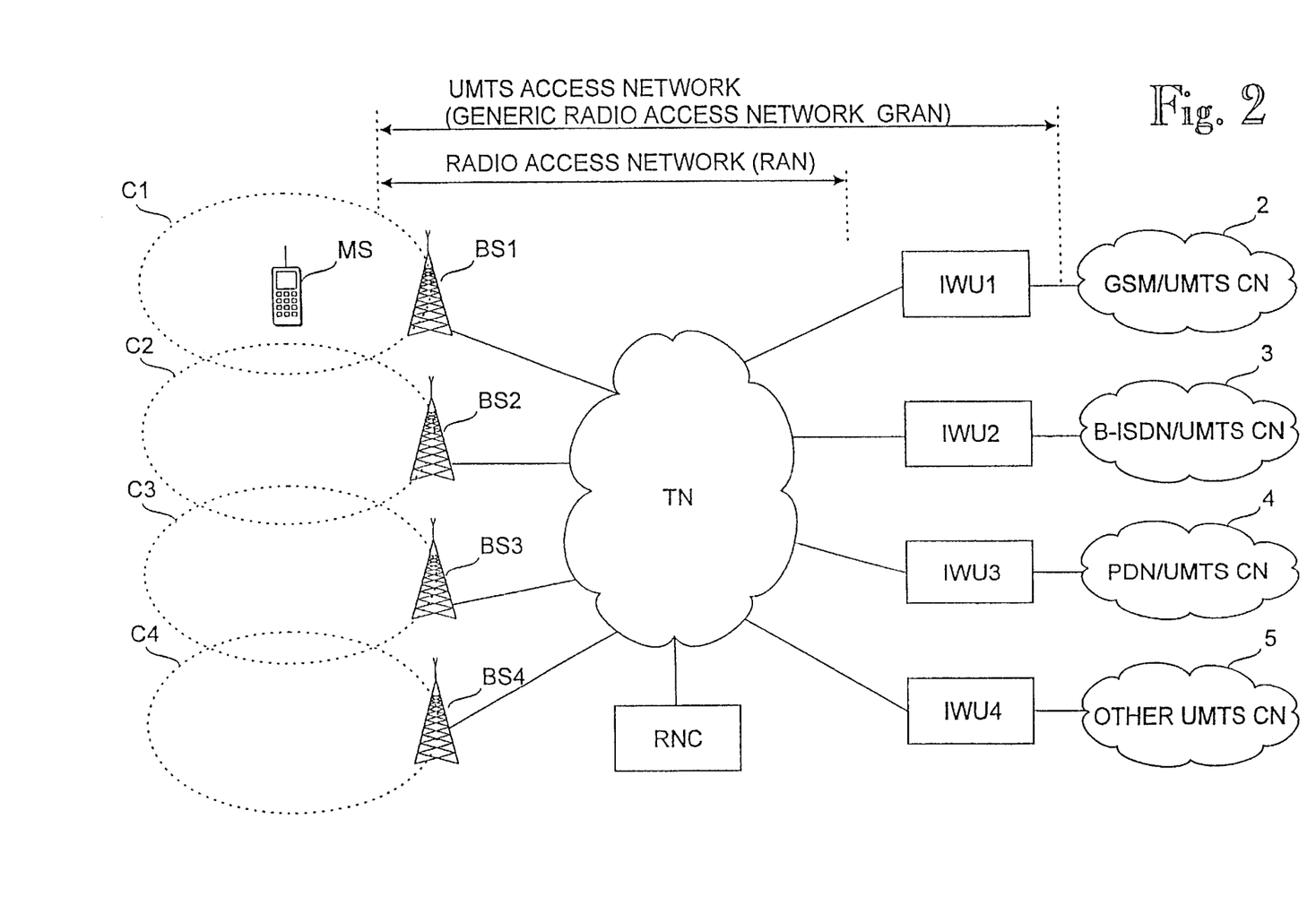
FIG. 2 is a diagram illustrating a possible UMTS access network structure in detail.

In the present perception, UMTS is built up of two or three carts that are illustrated in FIGS. 1 and 2: UMTS access network 1 (or UMTS base station system, UMTS-BSS) and a core network 2, 3, 4 and 5. The UMTS access network will also be generally termed a radio access network in the following. The UMTS access network 1 is mainly. responsible for things related to the radio path, i.e., it offers to the core network radio access that is needed for cordless operation. The core network 2, 3, 4 or 5 is a conventional or future telecommunications network modified to effectively utilize the UMTS access network in cordless communication. Telecommunications networks that have been contemplated as suitable core networks include the ISDN (Integrated Services Digital Network), B-ISDN (Broadband Integrated Services Digital Network), packet data networks PDN, Asynchronous Transfer Mode (ATM) networks etc., and second generation mobile communications systems, such as GSM (Global System for Mobile Communication).

Hence, the UMTS access network must be capable of providing support to various core networks, also those evolving in the future. Likewise, UMTS access networks should permit connection of various radio interfaces to the core network (narrowband, broadband, CDMA, TDMA etc.). Furthermore, the UMTS access network is typically simultaneously connected to several core networks, and hence must be capable of simultaneously supporting different core networks and their subscribers and services.

It is considered that the services of a radio access network are offered from core networks. The protocol controlling the bearer services of the radio access network should be capable of setting up through the network bearer services that would best satisfy different services in each core network. The bearer services may comprise several parameters wherewith the service quality and the efficiency of the radio network may be enhanced service-specifically.

A conceivable core network is the Transmission Control Protocol/Internet Protocol (TCP/IP) data network, the so-called Internet network. It is also possible that access to the Internet is provided through another core network, such as the General Packet Radio Service (GPRS) network. The Internet makes use of a number of TCP/IP application protocols. These include:

TELNET. This protocol enables a user terminal (or a user application program) in one machine to communicate interactively with an application process, such as a text editor running in a remote machine, as if the user terminal were directly connected to it;

FTP (File Transfer Protocol). This protocol enables a user terminal (or a user application process) to access and interact with a remote file system;

SMTP (Simple Mail Transfer Protocol). This protocol produces a network-wide mail transfer service between electronic mail systems in different machines;

SNMP (Simple Network Management Protocol). This protocol enables a user (e.g. a network management system) to collect throughput data of a network element (such as a bus or a gateway) and to control its operation through the network itself, WWW (World Wide Web)

Figure 3:
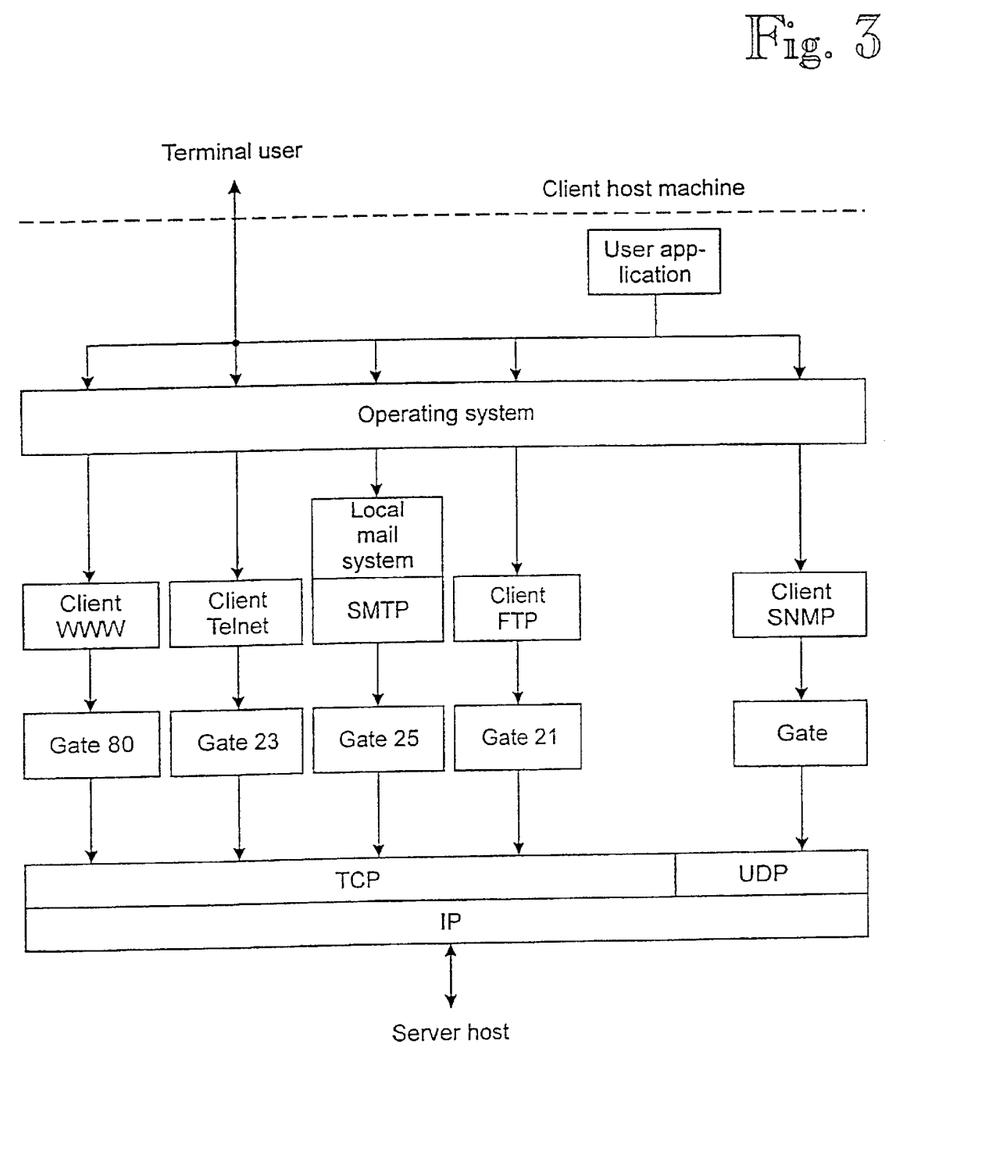
FIG. 3 shows the TCP/IP protocol structure.

FIG. 3 illustrates the structure of the TCP/IP protocol. As can be seen in the figure, the application protocols are accessed through the local operating system either by a user application process or, more usually, by a user at a terminal. The application protocols, on the other hand, are connected to the IP protocol layer by means of a transport layer comprising either UDP (User Datagram Protocol) or TCP (Transmission Control Protocol). A feature common to all client-server interactions is the establishment of a traffic route between two application protocols or processes. All server application processes have an associated name which translates into a corresponding network-wide address. The translation procedure is carried out by a process known as the domain name server. The network-wide address consists of two parts: the network-wide IP address of the host in which the process is running and a local port number. The IP address is used by the IP protocol to route datagrams across the Internet to the required destination host. The port number is then used by the TCP protocol within the host—or UDP, if this is being used—to identify the specific process within that host to which a received message should be sent. An open system will include multiple clients and servers both of different types and of the same type. All servers of the same type, however, are assigned the same system-wide port number. For example, the port numbers of the above-described application protocols are as follows: FTP 21, TELNET 23, SMTP 25, and WWW 80. When a client process initiates a call to a correspondent server process, it uses as a destination address the IP address of the host in which the server is running coupled with the appropriate well-known port number of that server. As a source address it uses the IP address of its own host together with the free (unused) port number on that host. If TCP is being used, the local TCP protocol entity will then establish a transport connection between the client and server processes (using these addresses) over which the appropriate message exchanges can take place.

In the present-day Internet network, all services are 'best effort' ('best try'). services. This means that the applications or users are not guaranteed any given level of quality, but the operating parameters, such as the bit error rate (BER) or delay, vary according the instantaneous degree of utilization of the Internet. Many applications, however, have clearly different optimum operating parameters. For example in a Telnet session the essential factor is the end-to-end delay, whereas in an FTP session the mean bit rate is decisive. In FTP it is insignificant if the delay experienced by individual packets is relatively long, as long as the mean bit rate remains adequate. In a Telnet session, on the other hand, the bit rate is very low, but the delay experienced by individual packets is the critical factor for the quality of the user service. Hence, the requirements placed by the different applications of Internet differ to some extent.

BRIEF DESCRIPTION OF THE INVENTION

It is an object of the present invention to provide the best suitable bearer service for TCP/IP services in a radio access network from the point of view of the radio access network and the supported TCP/IP service.

This is achieved with a method for setting bearer service parameters for a radio network in a radio access network connected to a core network which is an IP/TCP network or offers a connection to an IP/TCP network, the method comprising the steps of receiving to the boundary of the radio access network a first IP packet relating to a given connection and reserving a bearer service for the connection in the radio access network. The method is characterized by identifying the TCP/IP service to which the IP packet relates on the basis of the content of the IP packet, maintaining in the radio access network information on the bearer service parameters required by each TCP/IP service, setting the bearer service parameters in accordance with the identified TCP/IP service in the radio access network.

The invention also relates to an arrangement for setting bearer service parameters in a cellular radio access network connected to a core network which is an IP/TCP network or offers a connection to an IP/TCP network, the arrangement comprising resource control means for the radio access network by means of which bearer services are reserved for the connections, and first means located at the boundary of the radio access network, initiating reservation of a bearer service for a given connection upon receipt of a first IP packet relating to the connection. The arrangement is characterized in that it further comprises second means maintaining information on the bearer service parameters required by each TCP/IP service in the radio access network, said first means being adapted to identify the TCP/IP service on the basis of the content of the IP packet received from the core network and requesting from the resource control means a bearer service having the bearer service parameters required by the identified TCP/IP service, obtained from the second means.

The basic idea of the invention is that the bearer service parameters required by different TCP/IP services are predetermined in the radio access network, the correct parameters for a given connection being selected by identifying the TCP/IP service on the basis of the content of the first IP packet received. In this way, different TCP/IP services can be handled in different ways in the radio access network and a bearer service that best corresponds to the actual needs can be established through the radio access network. This avoids any collapse in service quality that the user might experience when data is transferred through the radio access network, as can happen if all services are given the same treatment. By means of the invention, not only can service quality as experienced by the user be improved, but optimization of the capacity of the radio access network is also enabled when only correct-type capacity is reserved for each connection.

In the primary embodiment of the invention, the TCP/IP service is identified on the basis of the port number in the destination port field in the TCP or UDP packet in the user data field of the IP packet. The service quality required by the TCP/IP service can also be interpreted from the protocol field of the IP packet, which indicates whether the overlaying transport protocol is TCP or UDP, for instance. Since the protocols of the different transport layers may have completely different requirements, this information can be used for setting the bearer service parameters in the radio access network. The service type field of the IP packet may also be used in the same way. Furthermore, the different subscription-specific conditions in the radio access network can be taken into account in setting the bearer service parameters. An upper limit for the bit rate or price may be defined for the subscriber, for instance.

The identifying and selection of bearer service parameters on the border of the radio access network may be carried out at the mobile station when a mobile originated connection (call) is concerned, and in the boundary region of the core network and the radio access network when a mobile terminated connection (call) is concerned.

BRIEF DESCRIPTION OF THE DRAWINGS

The invention will be described in detail in the following by means of primary embodiments with reference to the accompanying drawings, in which FIG. 1 generally illustrates a UMTS access network and core networks connected thereto.

DETAILED DESCRIPTION OF THE INVENTION

The primary embodiments of the invention will be described in the following as implemented in a radio access network in accordance with the precepts of the UMTS system, but the invention is not intended to be limited to the UMTS system. The invention is suitable for use in any radio access network that is connected to one or more core is networks (telecommunications system) which is a TCP/IP network or offers a connection to a TCP/IP network.

FIG. 2 illustrates a network architecture for a UMTS access network in detail. It is to be noted, however, that this network architecture is only one of several possible alternatives. The network architecture shown in FIG. 2 is based on a scenario according to which the functions of the UMTS access network are closely limited to radio access functions. Thus, it mainly comprises functions for radio resource control (handover, paging) and for controlling the bearer service (control of radio bearer service). More complicated modes of function, such as registers, registering functions and mobility and location management, are located in each core network.

In accordance with UMTS terminology, the entire UMTS access network is termed a generic radio access network (GRAN). GRAN is further divided to a radio access network (RAN) and to an interworking unit (IWU) In principle, there is an IWU between each core network 2–5 and RAN, such as IWUs 1–4 in the figure. The purpose of the IWU is to provide a connection between the core network and RAN. Therefore the IWU comprises the necessary adaptations and other possible interworking functions. The interface IWU-CN is core network-specific. This enables development of core networks and the RAN independently of one another. For example, IWU may be connected to the base station subsystem BSS of a GSM network. Likewise, IWU2 may be connected to a local exchange of an ISDN network, for instance.

In FIG. 2, the radio access. network RAN comprises a transport network TN, a radio network controller RNC, and a base station BS. In the network architecture shown, the base stations are connected to the transport network TN, which transports the user data to the IWUs and the control signalling to the radio network controller RNC. All intelligence controlling the GRAN is located at the base stations (BS) and the radio network controller (RNC). As stated previously, this control is typically limited to control functions pertaining to radio access as well as to switching of connections through the transport network TN. The transport network TN may be an ATM network, for example.

It is to be noted that the detailed structure of the UMTS access network does not have any significance to the present invention. For example, the network structure shown in FIG. 2 may also comprise subscriber registers. The term radio access network in this application generally refers to any radio access network and network structure that is connected to a core network.

In the primary embodiment of the invention, it is presumed that the management of the radio resources of GRAN and the control of the bearer services are located in the radio network controller RNC. Within GRAN, a special signalling protocol is used for this purpose, termed radio bearer service protocol (RBC). The bearer service is represented by means of various bearer service parameters, examples of which will be given below. The bearer service parameters comprise four main classes: 1) traffic parameters, 2) quality of service (QoS) parameters, 3) information parameters, and 4) content parameters.

Traffic Parameters

Peak Bit Rate PBR, bit/s. The maximum instantaneous bit rate in connection with maximum burst size. Indicates the constant bit rate in the absence of other traffic parameters.

Sustainable bit rate SBR, bit/s. The upper bound on the conforming average bit rate of the connection.

Maximum burst size MBS, bits. Gives an estimation of the maximum burst size that may be transmitted at peak bit rate.

Frame size specification: number of entries, minimum size, intermediate size(s), maximum size. For unsynchronized services, a frame may have any size between minimum and maximum. For synchronized services, requested intermediate sizes may be defined and the list defines the discrete frame sizes used, corresponding to discrete bit rates.

Minimum bit rate MBR, bit/s. The minimum bit rate required for URAN ABR traffic.

Quality of Service (QuS) Parameters

Bit error rate BER. Bit error rate of the connection.

Delay.

Frame loss ratio FLR, per cent ratio. The ratio of lost frames to all frames sent.

Priority parameter.

Information Parameters

Direction, uplink/downlink. Gives the direction of a simplex bearer. For two-way bearers, "bi-directional" is specified.

Configuration, point-to-point/point-to-multipoint. Gives the configuration of the connection in terms of point-to-point or point-to-multipoint service.

Type, control/unsynchronized/synchronized. Control: the traffic consists of signalling. Unsynchronized traffic: the traffic is not synchronized with the radio interface timing. Synchronized traffic: Radio interface timing information is required.

Content Parameters

Coding: Indicates the speech codec used.

Let us assume that the core network 4 is a TCP/IP network or a network offering a transparent connection to a TCP/IP network. In that situation, a network element or function, e.g. IWU3, is provided at the boundary of GRAN, wherewith the radio access network and the TCP/IP network are adapted to one another. In a primary embodiment of the invention, it is assumed that the connection set up through GRAN is a transparent "tube" that transfers the IP packets from the boundary of GRAN (e.g. IWU3) to a MS and vice versa. The actual client host machine is thus connected to the MS. Hence, the adaptation function or network element (e.g. IWU3) at the boundary of GRAN must be capable of requesting the RNC to set up the correct bearer service and connection through GRAN in accordance with the PCB protocol. Once the connection is set up, the adaptation function IWU3 inserts the IP packets into the user data field of the protocol data units (e.g. ATM cell) used on the GRAN connection and sends them across the GRAN. The exact manner of implementing the data transfer and connection is not, however, significant to the invention.

It is essential to the present invention that such a function or network element at the boundary of GRAN is furnished with a feature wherewith it can identify TCP/IP service on the basis of the content of the IP packet and, on the basis of the identification, request from the RNC a bearer service that meets predetermined bearer service parameters. Various information in the IP packet (datagram) may be employed for identification of TCP/IP service.

Value 6 in the IP protocol field in the IP packet indicates that the protocol of the overlaying transport layer is TCP. Correspondingly, value 17 in the protocol field in the IP packet indicates that the protocol of the overlaying transport layer is UDP. It is possible to use this information as such for selecting the bearer service parameters. For example, it can be deduced from the fact that UDP is identified that the user does not require reliable transport (as there are no retransmissions on the transport layer). For this reason, the bearer service parameters predetermined for UDP could for example contain a lower frame loss ratio (FLR) and lower delay than TCP parameters. Identifying of UDP and TCP is not sufficient, however, for optimizing higher level services.

The type of service field in the IP packet defines various properties required of the connection: high reliability, high throughput, short delay, and low priority level. This information can also be used for selecting bearer service parameters for the GRAN connection.

The user data field in the IP packet contains a TOP or UDP packet. Both a TCP packet and a UDP packet contain a destination port field; the port number contained in this field may be used for identifying the most common services. The port numbers of the abovedescribed application protocols, for example, are the following: FTP 21, TELNET 23, SMTP 25, and WWW 80. When an optimum set of bearer service parameters is defined and stored for each application protocol, it can be retrieved after identification and sent to the RNC in an appropriate RBC message.

In the following, the mapping of TCP/IP services to GRAN bearer service parameters will, however, be described by means of examples. utilizing several of the above-described methods simultaneously, thus enabling better optimization.

EXAMPLE 1

FTP Service

FTP service is identified when the destination port field in the TCP packet is 21, the protocol field of the IP packet is 6 (TCP) and, optimally, the IP service type field=high throughput. On this basis, the following predetermined GRAN bearer service parameters are selected for the identified FTP service:

PBR: 64000 bit/s; SBR: 32000 bit/s; MBS 128000 bit/s; MBR: 16000 bit/s; frame size specification: two entries. (Max & Min), Max=576 (default value for maximum size of TCP segment), Min=40; BER:$10^{-9}$; delay: not defined or very low delay requirement, e.g. 10 seconds; priority: 10 (low).

EXAMPLE 2

Telnet Service

Telnet service is identified when the destination port field in the TCP packet is 23, the protocol field in the IP packet is 6 (TCP) and, optionally, the IP service type field=short delay. On this basis, the following predetermined GRAN bearer service parameters are selected for the identified Telnet service:

PBR: 1000 bit/s; SBR: 500 bit/s; MBS: 2000 bit/s; MBR: 0 bit/s; frame size specification: two entries (Max & Min) Max=576, Min=40; BER: $10^{-9}$; delay: 200 ms; priority: 3 (relatively high).

EXAMPLE 3

WWW Service

WWW service is identified when the destination port field in the TCP packet is 80, the protocol field in the IP packet is 6 (TCP) and, optionally, the IP service type field=low priority/maximize throughput. On this basis, the following predetermined GRAN bearer service parameters are selected for the identified WWW service:

PBR: 32000 bit/s; SBR: 16000 bit/s; MBS: 256000 bit/s; MBR: 8000 bit/s; frame size specification; two entries (Max & Min), Max=576, Min=40; BER: $10^{-9}$; delay: 1000 ms; priority: 5.

Instead of the above examples, any other appropriate mapping of the bearer service parameters to the TCP/IP services may naturally be used. In addition to the TCP and IP header information, also subscriber-associated data (relating to the subscription) may be used to determine the bearer service parameters. For example an upper limit for the price or bit rate may be defined in the subscriber data. In one embodiment of the invention, also the subscriber data is checked and taken into account in setting up the bearer service. The subscriber data may be available from an internal database of GRAN, but typically it must be requested from an external database located for example in the core network, such as a GSM home location register HLR.

In the following, the identification of a service and setting of bearer service parameters in accordance with the invention will be explained with reference to FIGS. 2 and 4. Let us assume initially that a first IP packet relating to a given connection is received by a function, device, or network element located at the boundary of GRAN (step 40, FIG. 4) and having the feature in accordance with the present invention. Where a mobile originated connection (call) is involved, the invention can be implemented from the mobile station MS, which receives the packets from a peripheral device or from its user application. Where a mobile terminated connection is involved, the invention can be implemented in the boundary region of the core network and the radio access network. Let such an element or function be IWU3 in FIG. 2, in which situation the first packet relating to the terminating connection is received from a TCP/IP core network.

Figure 4:
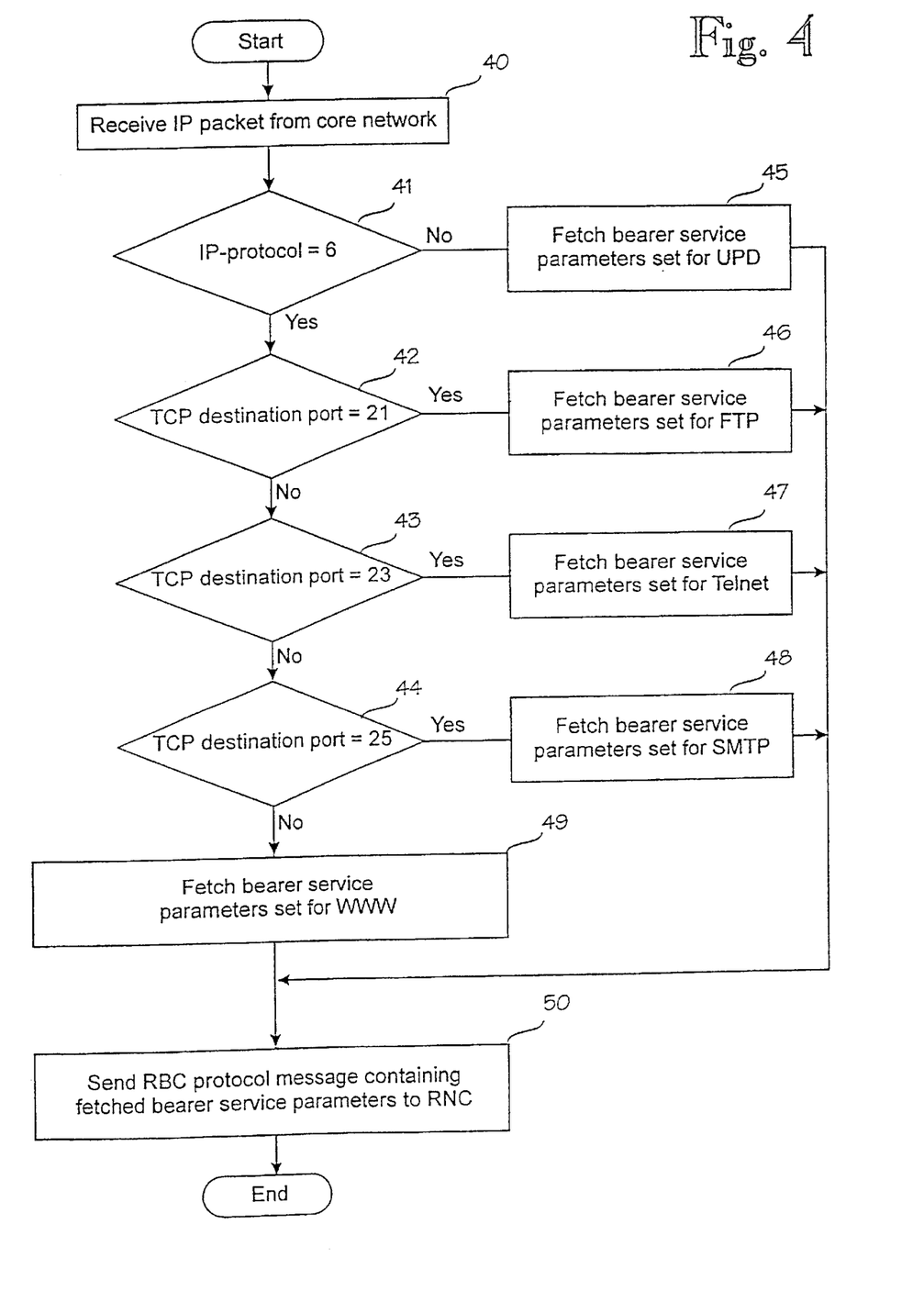
FIG. 4 is a flow chart illustrating the service identification and setting of service parameters in accordance with the invention.

With reference to FIG. 4, IWU3 analyzes the IP protocol field of the IP packet, step 41. If the value of the IP protocol field is not 6, IWU3 identifies UDP as the protocol of the transport layer and fetches from its database the GRAN bearer service parameters defined and stored for UDP, step 45. If the value of the IP protocol field is 6, IWU3 identifies TCP as the protocol of the transport layer.

Thereafter, IWU3 examines whether the value of the destination port field of the TCP packet, which is in the user data field of the IP packet, is 21, step 42. If this is the case, IWU3 identifies FTP as the application protocol and fetches from its database the GRAN bearer service parameters defined and stored for FTP, step 46. If the value of the destination port is not 21, the routine proceeds to step 43.

In step 43, IWU3 examines whether the value of the destination port field of the TCP packet is 23. If this is the case, IWU3 identifies Telnet as the application protocol and fetches from its database the GRAN bearer service parameters defined and stored for Telnet, step 47. If the value of the destination port is not 23, the routine proceeds to step 44.

In step 44, IWU3 examines whether the value of the destination port field of the TCP packet is 25. If this is the case, IWU3 identifies SMTP as the application protocol and fetches from its database the GRAN bearer service parameters defined and stored for SMTP, step 48. If the value of the destination port is not 25, the routine proceeds to step 49. In step 49, IWU3 presumes the application protocol to be WWW and fetches from its database the GRAN bearer service parameters defined and stored for WWW, step 48.

From all steps 45–49 the routine proceeds to step 50. IWU3 forms a connection establishment message in accordance with the RBC protocol, containing the fetched bearer service parameters. The message is sent over GRAN to RNC. RNC sets up the requested bearer service across GRAN between IWU3 and the called MS.

In the above, the invention has been described by means of primary embodiments to illustrate the principles of the invention. The invention may vary in its details within the scope and spirit of the appended claims.

What is claimed is:

1. A method for setting bearer service parameters for a radio network in a radio access network connected to a core network that is an IP/TCP network or offers a connection to an IP/TCP network, the method comprising the steps of
receiving to the boundary of the radio access network a first IP packet relating to a given connection,
reserving a bearer service for the connection in the radio access network,
identifying the TCP/IP service to which the IP packet relates on the basis of the content of the IP packet,
maintaining in the radio access network information on the bearer service parameters required by each TCP/IP service,
setting the bearer service parameters of the given connection based on the maintained information on the bearer service parameters required by the identified TCP/IP service in the radio access network.

2. A method as claimed in claim 1, comprising
identifying the TCP/IP service on the basis of the content of the TCP or UDP packet in the user data field of the IP packet.

3. A method as claimed in claim 2, comprising
identifying the TCP/IP service on the basis of the port number in the destination port field in the TCP or UDP packet.

4. A method as claimed in claim 1, characterized in that the TCP/IP services to be identified comprise at least one of the following application protocols: Telnet, FTP, SMTP, SNMP, and WWW.

5. A method as claimed in claim 1, comprising
checking the service type field in the IP packet,
taking into account the content of the service type field in setting the bearer service parameters.

6. A method as claimed in claim 1, wherein the bearer service parameters of the radio access network contain at least one of the following: peak bit rate, sustainable bit rate, maximum burst size, frame size, minimum bit rate, bit error rate, delay, frame loss ratio.

7. A method as claimed in claim 1,
checking the service data relating to the subscriber relationship in the radio access network,
taking into account the service data relating to the subscriber relationship in setting the bearer service parameters.

8. A method as claimed in claim 1, comprising
setting for FTP bearer service parameters that give as high a mean bit rate as possible.

9. A method as claimed in claim 1, comprising
setting for Telnet bearer service parameters that give as short a delay as possible.

10. A method as claimed in claim 1, comprising
performing said receiving, identification, maintenance and setting steps on the border of the radio access network at a mobile station when a mobile originated connection is concerned.

11. A method as claimed in claim 1, comprising
performing said receiving, identification, maintenance and setting steps in the boundary region of the radio access network and the core network when a mobile terminated connection is concerned.

12. A method for setting bearer service parameters for a radio network in a radio access network connected to a core network that is an IP/TCP network or offers a connection to an IP/TCP network, the method comprising the steps of
receiving to the boundary of the radio access network a first IP packet relating to a given connection,
reserving a bearer service for the connection in the radio access network,
identifying FTP when the destination port field of the TCP packet has the value 21,
identifying Telnet when the destination port field of the TCP packet has the value 23,
identifying SMTP when the destination port field of the TCP packet has the value 25,
identifying WWW when the destination port field of the TCP packet has the value 80, maintaining in the radio access network information on the bearer service parameters required by each TCP/IP service, and
setting the bearer service parameters in accordance with the identified TCP/IP service in the radio access network.

13. A method for setting bearer service parameters for a radio network in a radio access network connected to a core network that is an IP/TCP network or offers a connection to an IP/TCP network, the method comprising the steps of
receiving to the boundary of the radio access network a first IP packet relating to a given connection,
reserving a bearer service for the connection in the radio access network,
identifying from the protocol identification field of the IP packet whether the protocol of the transport layer is TCP or UDP,
taking into account the identified protocol of the transport layer in setting the bearer service parameters.

14. A cellular radio access network connected to a core network which is an IP/TCP network or offers a connection to an IP/TCP network, the cellular radio access network comprising a mechanism configured to set bearer service parameters, the mechanism including
a resource controller of the radio access network by means of which bearer services for the connections are reserved,
first unit located at the boundary of the radio access network and configured to initiate reservation of a bearer service for a given connection upon receipt of a first IP packet relating to the connection,
second unit configured to maintain information on the bearer service parameters required by each TCP/IP service in the radio access network,
said first unit being adapted to identify the TCP/IP service on the basis of the content of the IP packet received from the core network and requesting from the resource controller a bearer service having the bearer service parameters required by the identified TCP/IP service based on the maintained information obtained from the second unit.

15. An arrangement as claimed in claim 14, wherein
said first unit comprise a mobile station when a mobile originated connection is concerned.

16. An arrangement as claimed in claim 14, wherein
said first unit is located in the boundary region of the radio access network and the core network when a mobile terminated connection is concerned.

17. A cellular radio access network connected to a core network which is an IP/TCP network or offers a connection to an IP/TCP network, the cellular radio access network comprising a mechanism configured to set bearer service parameters, the mechanism including a resource controller of the radio access network by means of which bearer services for the connections are reserved, a first unit located at the boundary of the radio access network and configured to initiate reservation of a bearer service for a given connection upon receipt of a first IP packet relating to the connection, second unit configured to maintain information on the bearer service parameters required by each TCP/IP service in the radio access network, said first unit being further configured to adapted to identify the on the basis of the content of the IP packet received from the core network in a manner that the TCP/IP service is FTP when the destination port field of the TCP packet has the value 21, Telnet when the destination port field of the TCP packet has the value 23, SMTP when the destination port field of the TCP packet has the value 25, and WWW when the destination port field of the TCP packet has the value 80, the first unit being further configured to request from the resource controller a bearer service having the bearer service parameters required by the identified TCP/IP service, obtained from the second unit.

18. A cellular radio access network connected to a core network which is an IP/TCP network or offers a connection to an IP/TCP network, the cellular radio access network comprising a mechanism configured to set bearer service parameters, the mechanism including a resource controller of the radio access network by means of which bearer services for the connections are reserved, a first unit located at the boundary of the radio access network and configured to initiate reservation of a bearer service for a given connection upon receipt of a first IP packet relating to the connection, the first unit being configured to identify from the protocol identification field of the IP packet whether the protocol of the transport layer is TCP or UDP, the first unit being configured to taking into account the identified protocol of the transport layer in setting the bearer service parameters for the connection.

* * * * *